United States Patent
Folino et al.

[11] Patent Number: 6,068,573
[45] Date of Patent: May 30, 2000

[54] PANCAKE MOTOR NESTED WITHIN CAM SPEED CONVERTER

[76] Inventors: Frank A. Folino, 100 Deer Path La., Weston, Mass. 02193; Stuart E. Schechter, 194 Belleview St., Newton, Mass. 02158; Michael P. Cunningham, 49 Noyes Rd., Londonderry, N.H. 03053

[21] Appl. No.: 08/815,128

[22] Filed: Mar. 11, 1997

Related U.S. Application Data

[63] Continuation of application No. 08/553,768, Oct. 23, 1995, abandoned, which is a continuation-in-part of application No. 08/188,466, Jan. 26, 1994, abandoned, and a continuation-in-part of application No. 08/363,625, Dec. 23, 1994, abandoned.

[51] Int. Cl.[7] ............................. F16H 13/04; F16H 13/08
[52] U.S. Cl. ............................. 476/36; 476/18; 475/196
[58] Field of Search ................... 475/195, 196; 476/18, 36

[56] References Cited

U.S. PATENT DOCUMENTS

| | | | |
|---|---|---|---|
| 1,568,290 | 9/1926 | Morrison | 476/36 |
| 2,512,272 | 6/1950 | Gull | 74/63 |
| 3,039,324 | 6/1962 | Waterfield | 74/63 X |
| 3,049,019 | 8/1962 | Lapointe et al. | 476/36 |
| 3,468,175 | 9/1969 | Rabek | 74/63 |
| 3,807,243 | 4/1974 | Yada | 74/63 |
| 4,584,904 | 4/1986 | Distin, Jr. et al. | 74/63 X |
| 4,643,047 | 2/1987 | Distin et al. | 74/63 X |
| 4,960,003 | 10/1990 | Hartley | 74/63 |
| 5,016,487 | 5/1991 | Bollmann | 476/36 |

FOREIGN PATENT DOCUMENTS

| | | | |
|---|---|---|---|
| 24020 | 2/1922 | France | 74/63 |
| 1021945 | 2/1953 | France | 74/63 |
| 59-133863 | 8/1984 | Japan | 475/196 |
| 59-180153 | 10/1984 | Japan | 74/63 |
| 5-203009 | 1/1992 | Japan | 475/36 |
| 1399548 | 12/1986 | Russian Federation . | |
| 629387 | 9/1978 | U.S.S.R. | 476/36 |
| 1257331 | 9/1986 | U.S.S.R. | 475/196 |
| 1368545 | 1/1988 | U.S.S.R. | 475/196 |
| 1490362 | 6/1989 | U.S.S.R. | 476/36 |
| 1569470 | 6/1990 | U.S.S.R. | 475/196 |
| 710543 | 6/1952 | United Kingdom . | |

OTHER PUBLICATIONS

Abstract, Japan, Patent, 60–146954 (A) Aug. 2, 1985.
Abstract, Japan, patent, 60–4663 (A) Jan. 11, 1985.
Abstract, Japan, Patent , 60–179563 (A) Sep. 13, 1985.
Abstract, Japan, Patent, 60–129462 (A) Jul. 10,1985.
Abstract, Japan, Patent, JP890072449 Mar. 24, 1989.
Mechanical Engineering & Technology Guide, Balls Reduce Speed and Transmit Toryn; publ. prior to Mar.14, 1991.
Dojen™ Precision Rotary Actuator Designer'sGuide, (Div. of Lenze, Woburn, MA); publ. prior to Mar. 14, 1991.
Soviet Engineering Research vol. 6 Feb. (1986) No. 2, @pp. 23–26, Mowbray, Leicestershire GB; V. Mochinostroeniya: "Gen'l Info...".

*Primary Examiner*—Khoi Q. Ta

[57] ABSTRACT

A method and apparatus are provided for smoothing the ball transition in rolling element/cam type speed converters, with an alternative cable-run through the drive mechanism in either a single or multistage configuration.

12 Claims, 9 Drawing Sheets

PANCAKE MOTOR NESTED WITHIN CAM SPEED CONVERTER

This application is a continuation of U.S. patent application Ser. No. 08/553,768, filed on Oct. 23, 1995, now abandoned which is a continuation-in-part of U.S. patent application Ser. No. 08/188,466, filed Jan. 26, 1994 now abandoned, Attorney Docket Number FFY-001CN, entitled: SPEED CONVERTER, and U.S. patent application Ser. No. 08/363,625, filed Dec. 23, 1994 now abandoned, Attorney Docket Number FFY-008 CIP2, entitled: IN-LINE SPEED CONVERTER.

BACKGROUND OF THE INVENTION

The present invention relates to mechanical power transmissions, and more particularly, to speed reducers and the like.

Speed conversion is an important capability in the efficient utilization of rotary motive force. The occasion often arises for increasing or reducing of the speed of a drive member to a higher or lower speed at a driven member. In automobiles, for example, a hydraulic transmission, with various combinations of gear assemblies, accomplishes the task of translating the high rotary speed of the gasoline engine to the lower rotational requirements at the driven axle. Typically, such transmissions are quite complex, requiring many parts to operate in sophisticated syncopation, and are quite labor intensive for both assembly and service. Other speed conversion applications include elevators, where an electric motor typically is employed for lifting and lowering the elevator cab, and robotics, where an electric motor is employed as an actuator to effect motion. Typically in these applications, the speed reducer housing is mounted ("grounded") directly to the equipment housing. At times the effect of speed reduction is also referred to as torque amplification, and these concepts may be treated as interchangeable, for purposes of this disclosure.

It is therefore an object of the present invention to provide a speed converter which is simplified in nature but is robust in transmission capability.

It is a further object of the present invention to provide a speed converter which is relatively easy to assemble and service.

It is an additional object of the present invention to provide a speed converter design which is adaptable to a variety of situations.

SUMMARY OF THE INVENTION

These and other objects are well met by the presently disclosed, highly efficient, speed converting power transmission assembly of the present invention. The invention is applicable to an accelerating or decelerating input, whether clockwise or counter-clockwise rotating, with reversing or non-reversing output.

A preferred embodiment includes a speed converter apparatus for translating an input at a first velocity to an output at a second velocity. The speed converter has a primary drive disk defining a primary cam (a "drive" cam) for providing a rotary motion input at a first angular velocity.

The speed converter apparatus also includes a driven assembly. The driven assembly has a secondary cam on a secondary disk, and an intermediate disk element. The intermediate disk is a direction-dictating, directional element, located between the primary and secondary disks. The intermediate disk has slots for receipt of transmission elements (balls) therein. The speed converter output is taken from a driven disk, which is either the intermediate disk or the secondary disk.

In various embodiments, the primary and secondary cams are each formed on a face of a respective primary and secondary disk, and the slots are formed as radial slot paths in the intermediate disk. Each of the primary and secondary cams has a respective flank. Projections of these flanks intersect at unique points upon rotation of the primary cam, associated ones of these unique points defining respective ones of the slot paths in the intermediate disk.

A respective ball in a respective slot path is driven radially between a maximum and minimum radius by the primary cam. In one embodiment, the slotted intermediate disk is a reaction disk for reacting the drive force on the balls in the slots, and the secondary cam is driven into rotation by action of the oscillating balls. In another embodiment, the slotted intermediate disk is driven into rotation by action of the oscillating balls, with the drive force on the balls being reacted by the secondary cam, where the secondary disk is a reaction disk.

Overall, the primary cam is designed to cause a linear displacement of the balls for a given cam rotation. The secondary cam is configured for conjugate action with the primary cam, and which results in constant linear velocity of the radially traveling balls. The primary and secondary cams are thus referred to as a conjugate pair. The centerline of a respective slot is defined as the loci of the contact of the cams at the slots' given angular location.

In one embodiment, the primary cam contour varies substantially linearly with angular rotation at a first rate of variation. The secondary cam contour varies substantially linearly with angular rotation at a second rate of variation. The relationship of these variations determines the speed conversion ratio of the apparatus. In accordance with the foregoing, the speed ratio of the apparatus can be determined by comparing the inverse of the number of cycles of the primary cam to the number of cycles of the secondary cam.

In this embodiment of the invention, the first cam device is formed as a face cam on the primary cam disk, and in simplest form has one lobe (or cycle) starting at a base circle radius and proceeding about the center of the disk at a constantly increasing radius and at a constant angular rotation to a maximum radius at 180°, i.e., in the rise mode, and then proceeding in the fall mode at a decreasing radius of the same rate and constant angular rotation back to the original base circle radius, completing 360°.

The second cam device is formed as a multi-cycle face cam track on a second cam disk, and is mounted in a position facing the face cam track of the primary cam disk. Each cycle of this face cam track defines a rise mode and a fall mode. Each rise and fall mode of the plurality of cycles in the secondary cam are configured to have the same radial displacement, for uniform conversion during the main drive segment of the cams.

In a preferred embodiment of the invention, the ends of the cam segments that are modified for easing the transition of the balls changes the rate of ball travel in a controlled deceleration or acceleration.

A multi-stage drive with a through way for wire bundle run through the drive mechanism's center is also disclosed.

BRIEF DESCRIPTION OF THE DRAWINGS

These and other features and advantages of the present invention will be more fully understood by reference to the following detailed description in conjunction with the attached drawing in which like reference numerals refer to like elements and in which:

FIG. 7(a,b) shows cams modified according to the present invention.

DETAILED DESCRIPTION OF A PREFERRED EMBODIMENT

Figure 1:
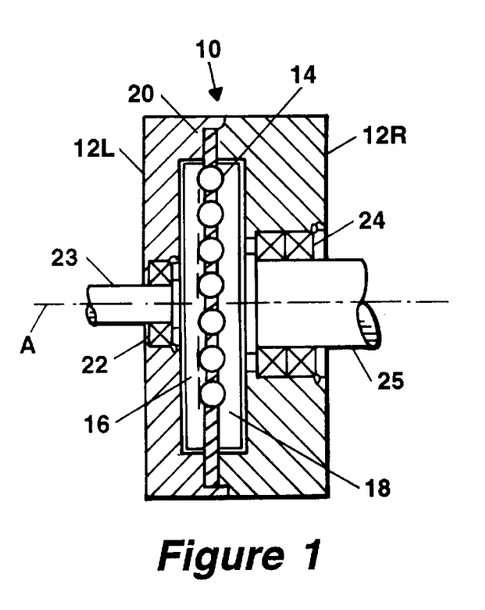
FIG. 1 is a sectional side view on the centerline of a single stage speed reducer.
Figure 2A:
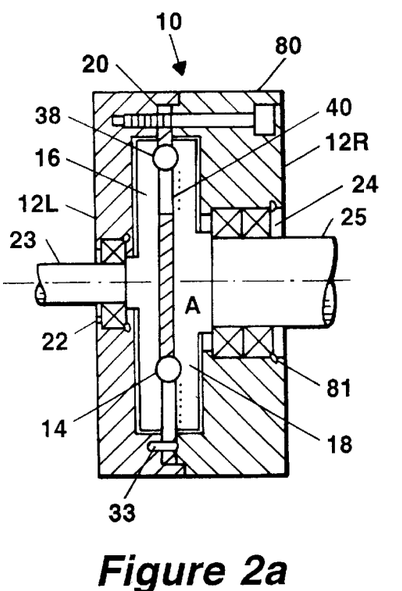
FIG. 2(a) is a sectional view on the centerline of FIG. 1, showing the top half of the reducer.
Figure 2B:
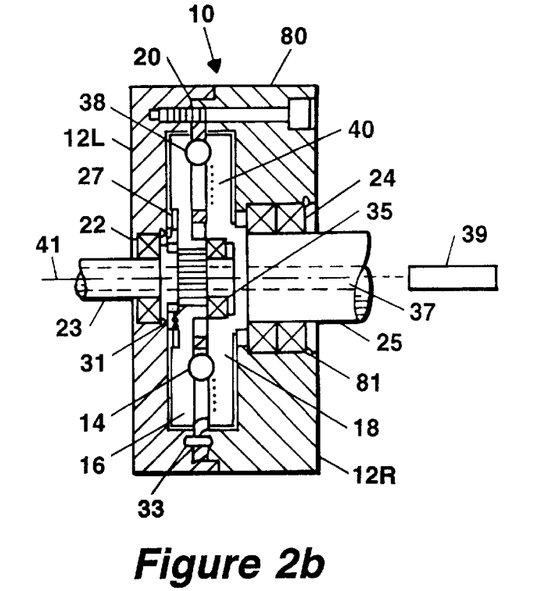
FIG. 2(b) is a sectional view on the centerline of FIG. 1 showing the top half in further detail.
Figure 3A:
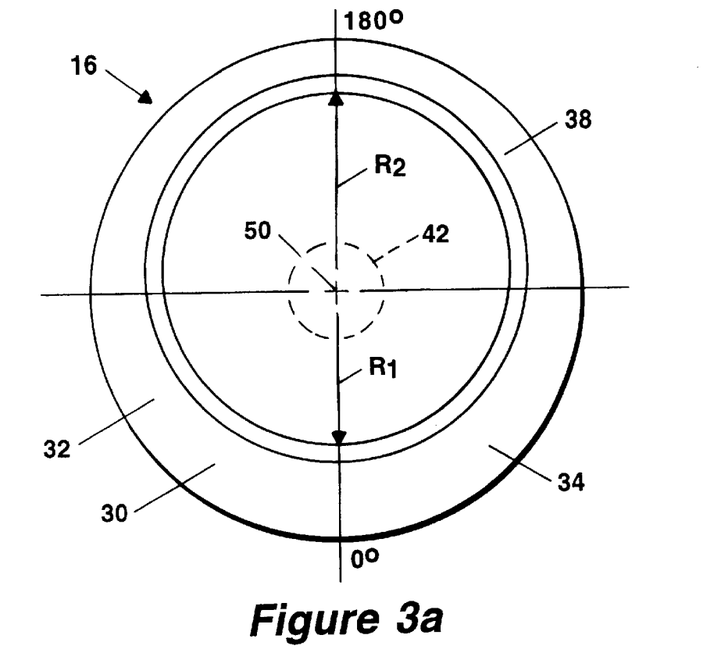
FIG. 3(a) is a plan view of a single cycle drive member face cam according to an embodiment of the present invention.
Figure 3B:
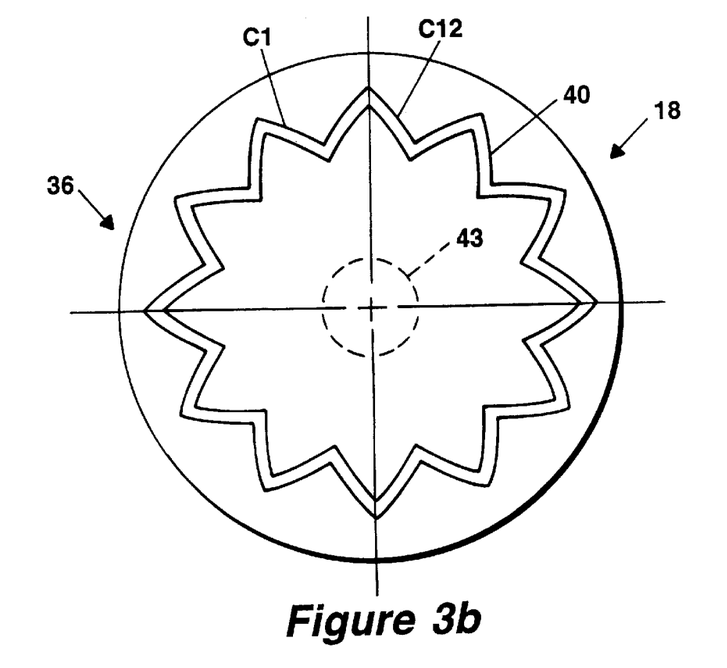
FIG. 3(b) is a plan view of a twelve cycle driven member face cam according to an embodiment of the present invention.

As taught in U.S. Pat. No. 5,312,306, incorporated herein by reference, a single-stage speed converter is shown in FIGS. 1 and 2. In this embodiment, the speed reducing and power transmission capability of assembly 10 is achieved by use of appropriately designed face cams on each of the drive member and driven member. The cams are interacted by the balls. FIG. 3(a,b) shows examples of two such cams, and are shown by way of illustration and not by way of limitation of the scope of the present invention.

As seen in FIG. 3(a), drive member 16 includes a single cycle (single lobe) cam 30 which rises from $R_1$ at 0 degrees to $R_2$ at 180 degrees (defining the rise side 32 of the cam) and back to $R_1$ at 360 degrees (defining the fall side 34 of the cam). The cam is asymmetric about the vertical centerline and is generated from $R_1$ to $R_2$ in a prescribed curve relative to the center 50. The cam takes the form of a one cycle ball track 38.

As shown in FIG. 3(b), driven member 18 is preferably concentric to the shaft. In this embodiment, member 18 includes a 12 cycle (C1–C12) cam 36, taking the form of a concentric 12 cycle ball track 40. Each one of these 12 cycles accommodates the rise and fall of the single cycle drive cam, and each such accommodation rotates the driven member 1/12 of a full revolution of the driven member, in this embodiment.

Figure 4:
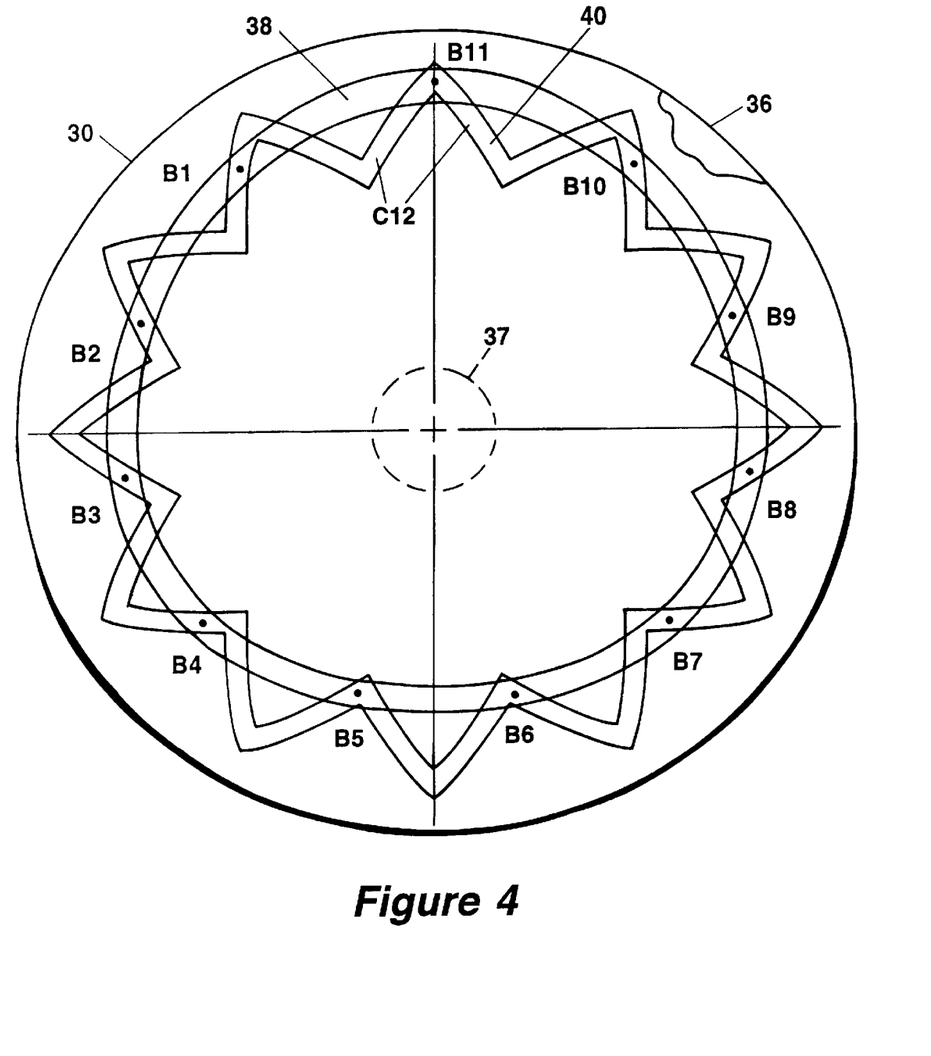
FIG. 4 is a conceptual overlay of the single cycle drive member of FIG. 3(a) and the twelve cycle driven member of FIG. 3(b).

The cooperation of the two cams of this embodiment is profiled in the overlay of FIG. 4. Cams 30 and 36, and specifically ball tracks 38, 40, are configured so as to support balls 14, FIG. 1, between them at locations B1 to B11. The balls are retained in these assigned locations by reaction disk 20. In this embodiment, the reaction disk is provided with a plurality of radial ball travel slots S1–S11, each slot being placed equidistant from its nearest neighbors and from the center 50 of the retainer.

The reaction disk has several functions. The first is to provide a reaction to the rotary motive forces that are being transmitted through the balls. This function will be described later. The reaction disk is also utilized during the assembly procedure of the speed reducer in that it will locate and retain the balls in their proper orientation and align the cams. Thirdly, at the extreme travel of the balls in slots S1–S11, the balls are assisted in their transition from a rise mode to a fall mode and in reverse.

In operation, the balls 14 translate rotation of input shaft 23 and drive member 16, FIG. 1, in a given direction (e.g., clockwise, as viewed from the input shaft), to a lower rotation of driven member 18 and output shaft 25 in the same direction. The balls translate in and out radially during rotation of the cams. There is no angular rotation of the balls or the retainer (reaction disk 20) since they are structurally coupled, see pin 33, to the stationary housing 12, FIG. 2(a). The only rotating elements in the entire assembly are the drive and driven cams.

Figure 5A:
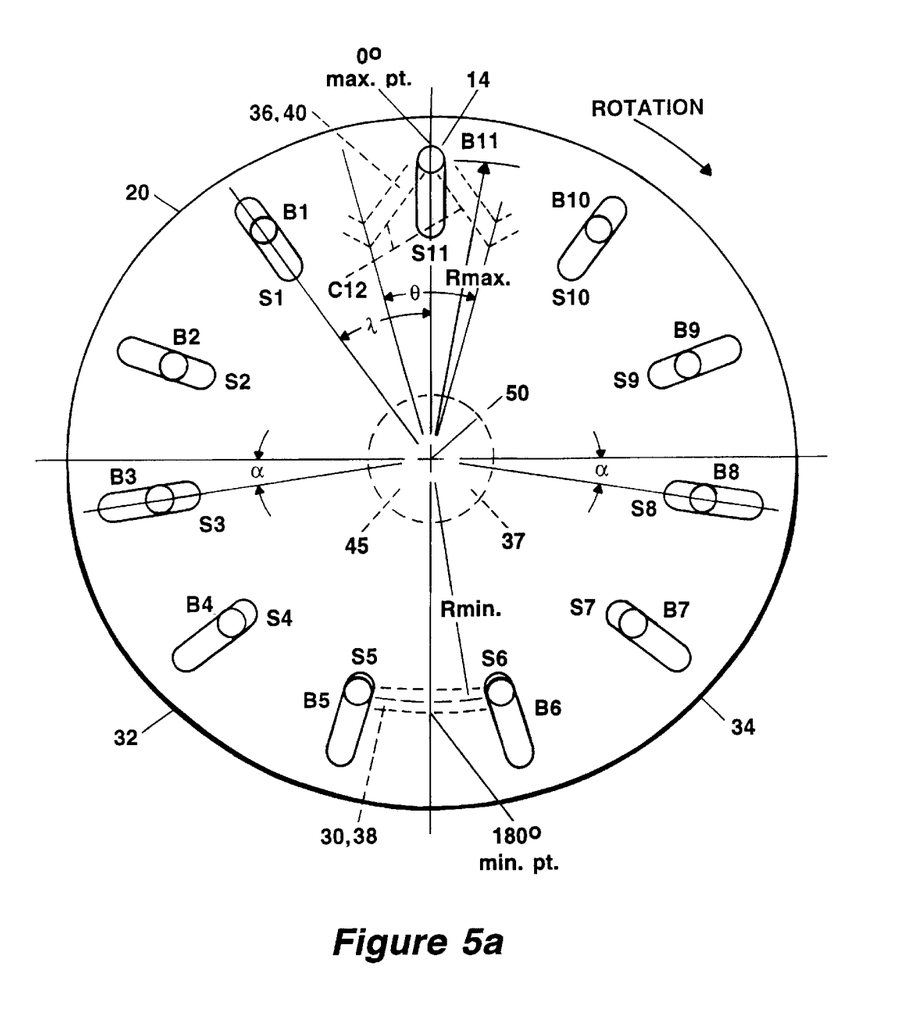
FIG. 5(a) is a plan view of a slotted reaction disk with balls installed according to the embodiment of FIGS. 1–4.
Figure 5B:
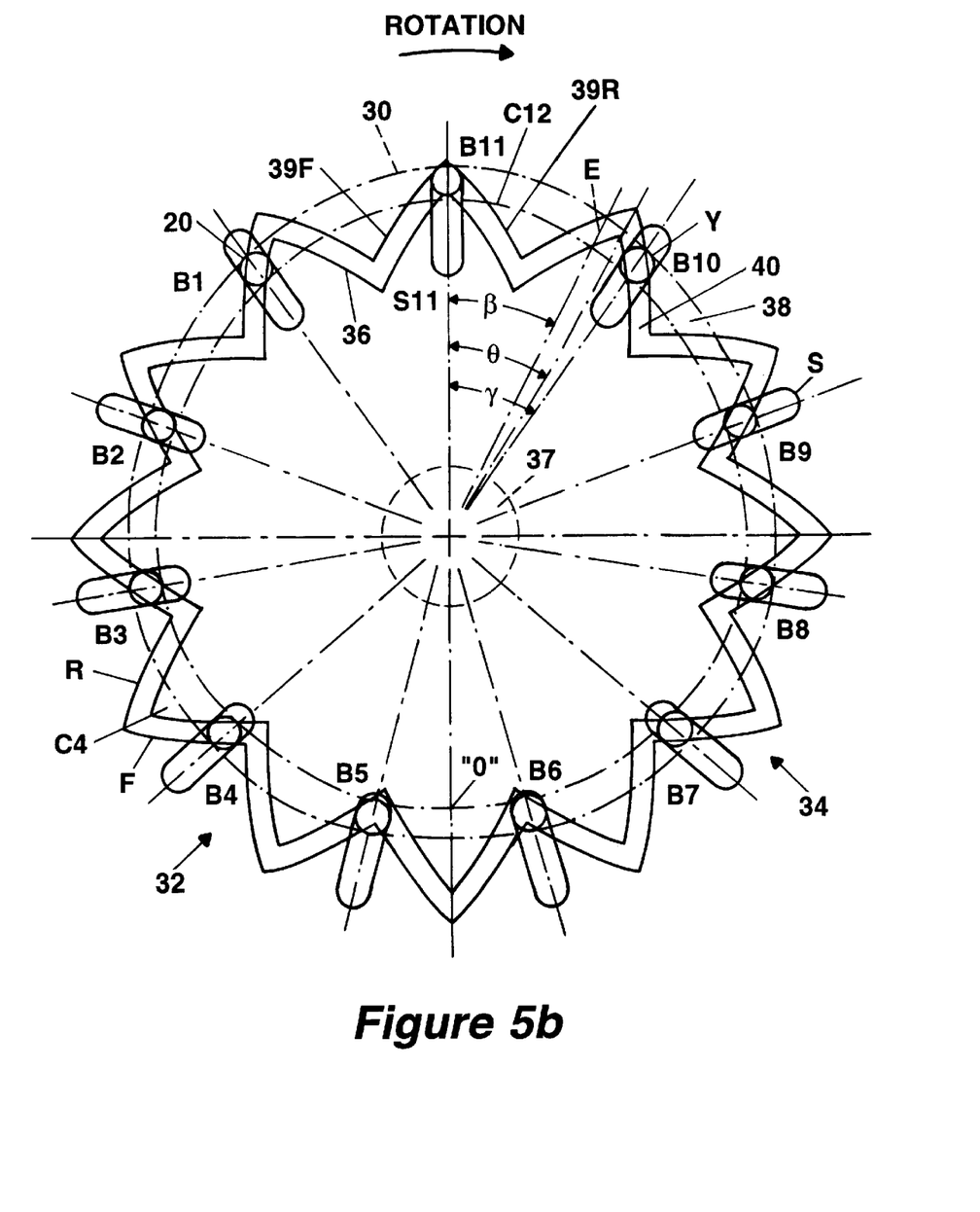
FIG. 5(b) is an overlay plan view of a single cycle drive cam, twelve cycle driven cam and balls and slots of the reaction disk according to an embodiment of the present invention.

FIG. 5 shows the cooperation of the drive and driven cams and intermediate reaction disk with balls in the slots thereof of the embodiment of FIGS. 1–4. These cams are preferably formed having a rise flank R and a fall flank F on each cycle (or tooth) as shown at cycle C4. A first of these flanks traces a segment of a linear curve and the other flank traces a mirror image of that segment, when formed according to the preferred embodiment taught in U.S. Pat. No. 5,312,306.

Figure 6:
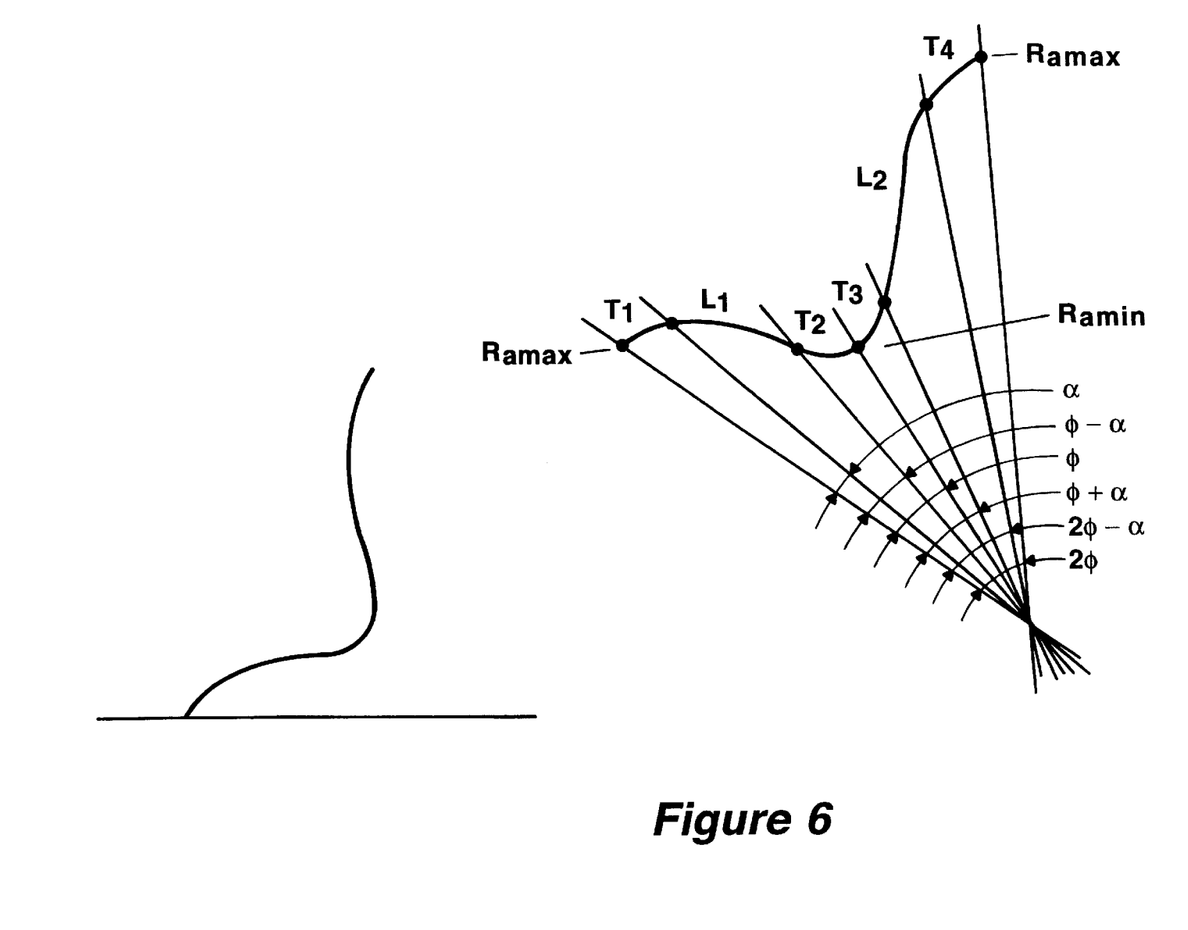
FIG. 6 shows a cam cycle having six segments according to the invention.

In practice of the present invention, each such curved segment is broken into six major parts, as shown in FIG. 6. The curve segment starts at an extreme, such as at Ramax, and extends through a transition part T1, a middle drive part L1, another transition part T2 to the other extreme, Ramin. The part then continues through transition T3, a middle drive part L2, a last transition part T4 returning to the extreme Ramax. Over the transition parts the ball is going into or leaving the transition point at the Ramin or Ramax where the ball stops its travel and changes direction in the slot S.

The sharp points of the cams shown in U.S. Pat. No. 5,312,306 indicate instantaneous transition. In practice of the present invention, the middle drive part L1 and L2 continues to be formed by the linear curve (preferably a linear spiral) as a first function, but the T1 through T4 transition parts are formed by a transition function, as a second function, to modify the cam tips to provide a smooth transition from one flank to another. Tip modification is important because of the balls traveling at a constant speed in the reaction disk slot need to change direction at Rmax and Rmin. To do this in a controlled manner requires a continuous or at least piecewise continuous function such that, at least, the first derivatives are conserved.

The benefits are noise abatement, avoidance of sudden velocity change, reduction of wear/forces/stress at sharp corners, and provides control of acceleration/deceleration of the ball. The continuous/piecewise continuous function used at the transition parts Tmin and Tmax reduces instantaneous ball changes, plans for only one unloaded ball at a time, and reduces torque ripple.

Figure 7:
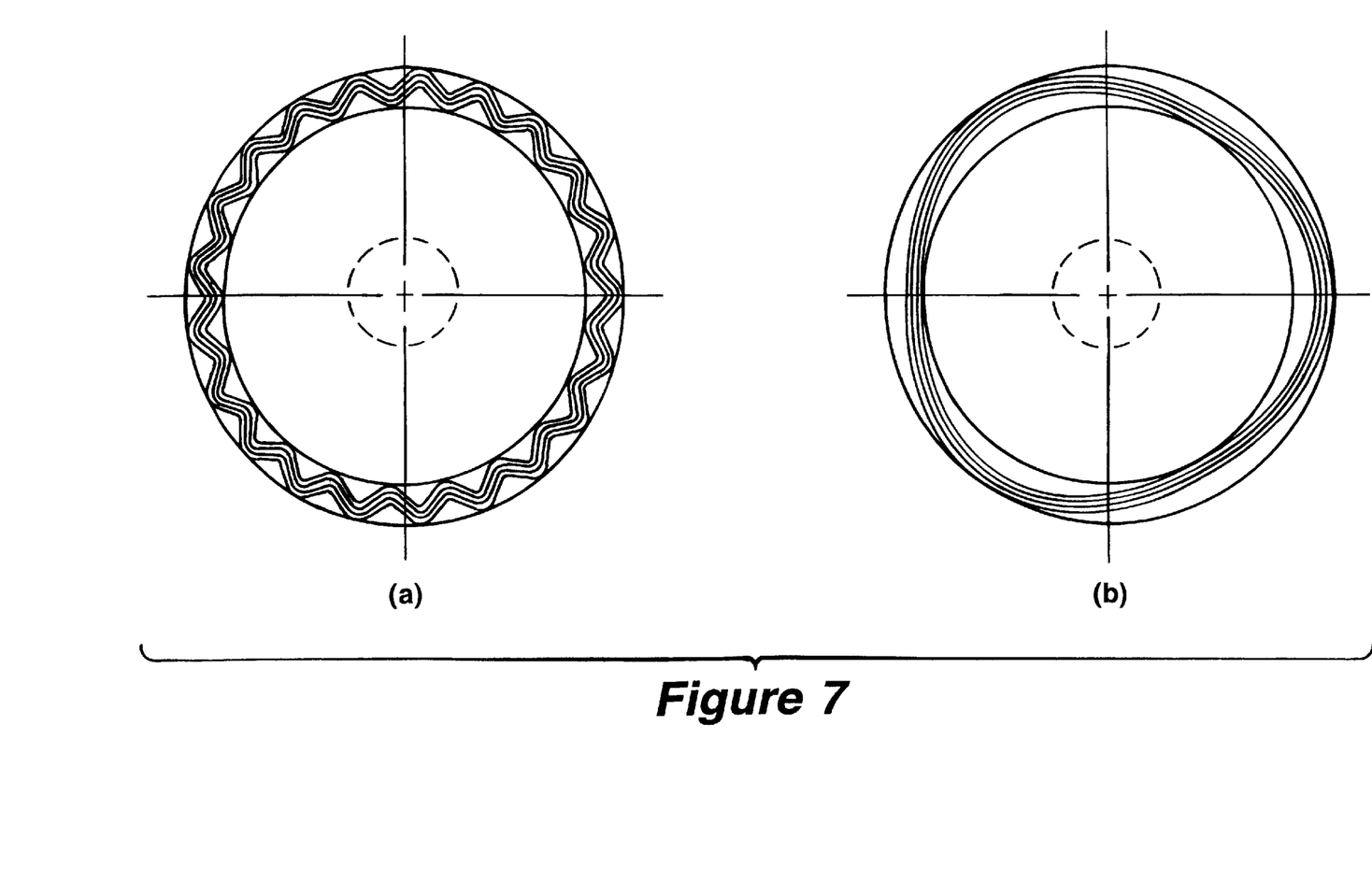

Conjugate cams formed according to the invention are shown in FIG. 7(a,b) having smoother tips at each transition. The resulting device is quieter and smoother in operation.

It will now be appreciated that a speed converter made in accordance with the teachings of the present invention will have a ratio of drive cam(s) to driven cam(s) of other than unity (less than for reduction, more than for increasing). This invention has a multiplicity of applications, including: automotive transmissions, robotics applications, elevation drives, and the like. Various modifications of the specific embodiments set forth above are also within the spirit and scope of the invention. Furthermore, a translation device with other than constant angular velocity may be developed for special applications. Nevertheless, the scope of these and other embodiments is limited only as set forth in the following claims.

FIG. 2b shows an alternative embodiment of the invention having a through way 37 for receipt of a wire bundle 41. An optional shield 39 protects the wire bundle from the rotating parts. The drive cam 16, driven cam 18, and reaction disk 20 have through holes 42, 43 and 45, respectively.

Figure 8:
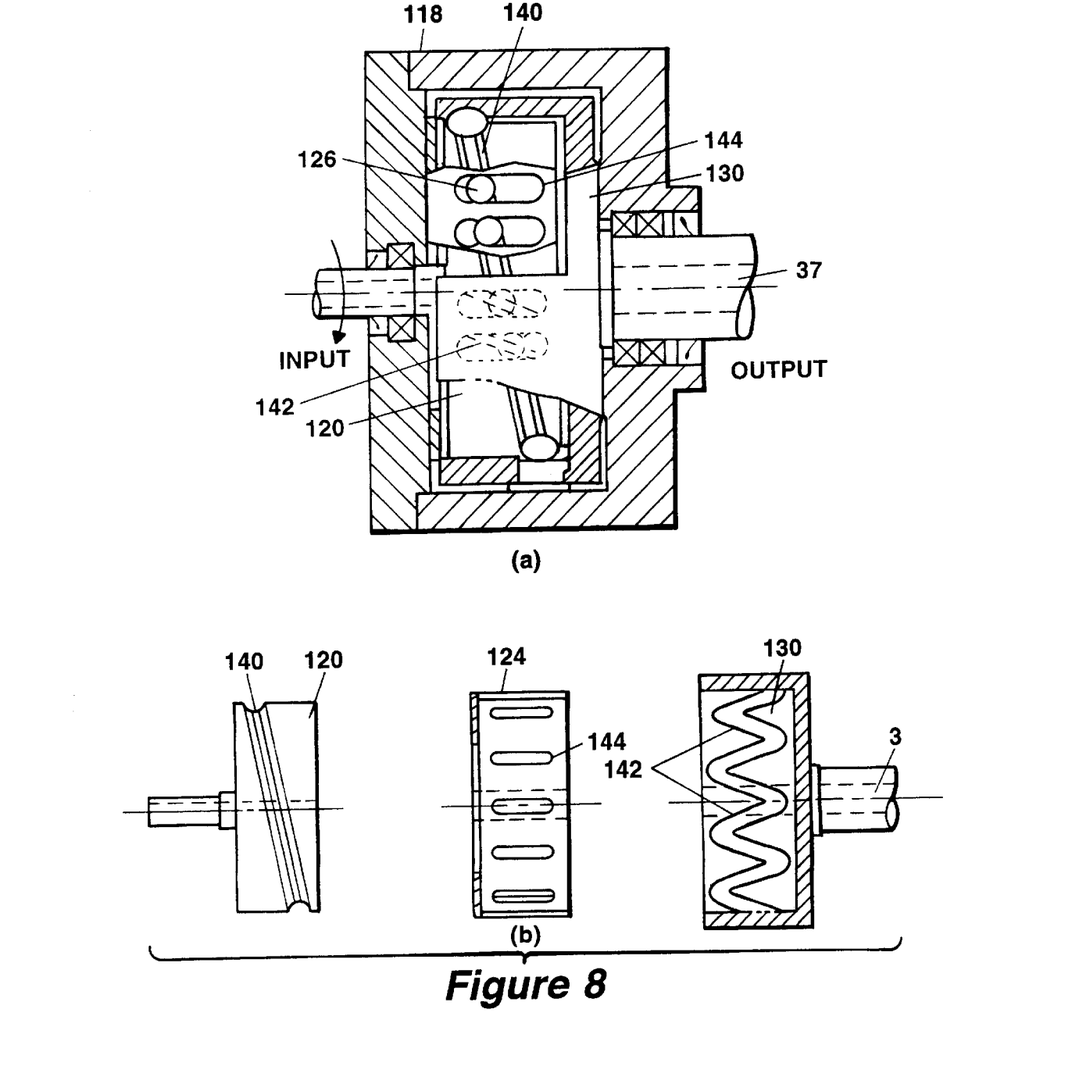
FIG. 8 shows cylindrical embodiment of the invention.

The cylindrical embodiment of FIG. 8 also has through way 37, and has housing 118, which receives drive cam 120 with track 140, reaction disk 124 having slots 144 and driven cam 130 with its track 142. The driven disk is mounted by a bearing on a shaft and is captured to the bearing. The motion of the ball(s) 126 caused by the drive disk track 140 and reacted by the reaction disk 124 are translated to grooves 142 cut into the back surface of the driven disk 130 which causes the driven disk 130 to rotate as the drive cam is rotated.

Figure 9:
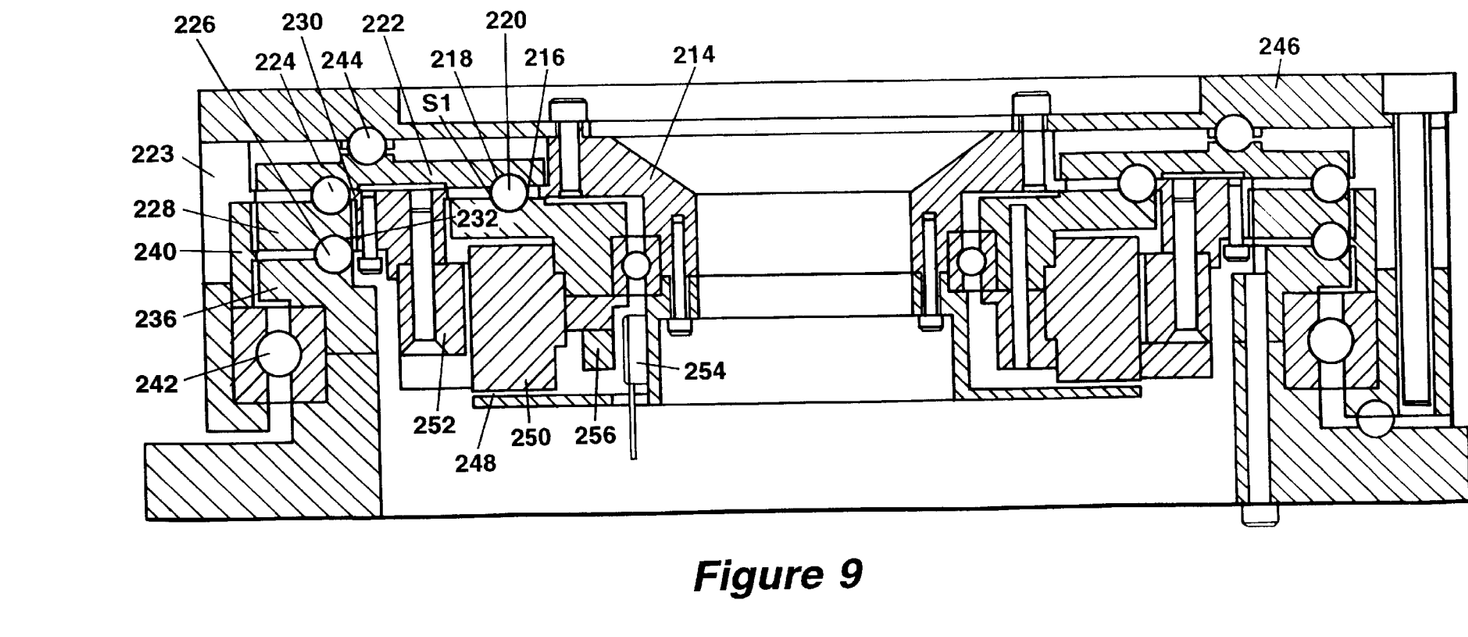
FIG. 9 shows a multi-stage embodiment of the invention.

FIG. 9 shows a multi-stage pancake embodiment of the invention. Drive disk 214 is the input of the device and has a drive cam 216 thereon. Cam 216 cooperates with driven cam 218 on intermediate disk 222 through balls 220 in slots s' in reaction disk 223. A drive cam 224 also on that same side of intermediate disk 222 cooperates with driven cam 226 on second intermediate disk 228 through balls 230 in slots s" in reaction disk 223. A drive cam 232 on the other side of disk 228 cooperates with driven cam 234 on output disk 236 through balls 238 in slots s'" of reaction disk 240. Output disk 236 is supported by radial bearing 242 and the first intermediate disk 222 has a thrust bearing 244 formed between its back side and the inside of housing baseplate 246.

Optionally internal motor 248 drives the input. Rotor 250 is mounted on drive disk 214 and motor stator 252 is pinned to the joined and grounded reaction disks 240 and 223 and baseplate 246. Optional position sensor 254 cooperates with magnets 256 to give an accurate positional reading of the motor rotor and hence the driven output.

What is claimed is:

1. A speed converter assembly with speed conversion stages, said assembly comprising:

(a) a primary stage with a primary rotary input part and a primary rotary output part, said input part having a first device for providing an input speed, said output part having a second and third device cooperating to provide an output speed at said output part, each of said devices being located about a common axis, one of said devices comprising a slotted member with at least one slot extending at least between minimum and maximum displacements, said slot being for receipt of an interacting element, rotation of one of said devices putting said interacting element in motion between said maximum and minimum displacements and another one of said devices being put in rotary motion by said in-motion interacting element, one of said devices comprising a first cam device having at least one cam cycle, and a second of said devices comprising a second cam device and having at least one cycle, said cam devices comprising a conjugate pair of cam devices, and all said devices cooperating together for converting said input speed to said output speed, wherein said output speed is related to said input speed according to the ratio of the number of cycles of said first and said second cam devices, (b) a secondary stage comprising a secondary rotary input part and a secondary rotary output part, said secondary input part having a first device for providing an input speed, said secondary output part having a second and third device cooperating to provide an output speed at said secondary output part, each of said devices being located about said common axis, one of said devices comprising a slotted member with at least one slot extending at least between minimum and maximum displacements, said slot being for receipt of an interacting element, rotation of one of said devices putting said interacting element in motion between said maximum and minimum displacements and another one of said devices being put in rotary motion by said in-motion interacting element, one of said devices comprising a first cam device having at least one cam cycle, and a second of said devices comprising a second cam device and having at least one cycle, said cam devices comprising a conjugate pair of cam devices, and all said devices cooperating together for converting said secondary input speed to said secondary output speed, wherein said secondary output speed is related to said secondary input speed according to the ratio of the number of cycles of said first and said second cam devices of said secondary stage, and (c) wherein said primary stage output is connected to said secondary stage input such that said primary stage output speed is the same as the secondary stage input speed, and (d) all said devices being mounted concentric to said common axis and cooperatively defining a pancake speed converter assembly with an open passage running therethrough along said axis.

2. The assembly of claim 1 wherein said slots are through-slots.

3. The assembly of claim 1 further comprising a housing, wherein said stages are mounted within said housing, and said first stage further comprises a motor located within said housing and having a stator mounted to said housing and a rotor connected to said first device for providing said input speed.

4. The assembly of claim 1 wherein pairs of said devices comprises a drive cam and a driven cam.

5. The assembly of claim 1 wherein one said parts comprises a reaction member.

6. The assembly of claim 5 wherein said drive disk of the first of said pairs is mounted to said motor rotor, wherein rotation of said rotor causes rotation of said driven disk of said second pair relative to said housing, said housing comprising a baseplate and said reaction member.

7. The assembly of claim 6 wherein said slotted member comprises a plurality of radial slots, and the interacting elements are balls for travel in said slots.

8. The assembly of claim 6 further comprising a sensor mounted on said housing and giving a positional reading of the motor rotor location relative to said baseplate.

9. The assembly of claim 8 wherein one of said devices of said first stage and one of said devices of said second stage are formed on the same disk.

10. Apparatus for converting motion from a first motion to a second motion, the apparatus comprising:

a conjugate pair of devices mounted in a housing and rotatable about a common axis, said pair having a drive disk and a driven disk, and having an oscillatable translation part located about the common axis for translating rotary motion of the drive disk to rotary motion of the driven disk, and an internal motor mounted entirely within said housing, said motor having a rotor and a stator, said rotor mounted to said drive disk and said stator mounted to said housing, wherein motorized rotation of said motor rotor causes rotation of said driven disk via said driven part via said oscillatable translation part.

11. The apparatus of claim 10 wherein said housing defines a baseplate and further comprising a position sensor mounted stationary relative to said baseplate and cooperating with said rotor to indicate position of said motor rotor relative to said baseplate.

12. The apparatus of claim 10 wherein all said devices are mounted concentric to said common axis and cooperatively define along said axis an open passage therethrough.

\* \* \* \* \*